US006993640B2

(12) United States Patent
Doing et al.

(10) Patent No.: US 6,993,640 B2
(45) Date of Patent: Jan. 31, 2006

(54) APPARATUS FOR SUPPORTING A LOGICALLY PARTITIONED COMPUTER SYSTEM

(75) Inventors: Richard William Doing, Rochester, MN (US); Ronald Nick Kalla, Zumbro Falls, MN (US); Stephen Joseph Schwinn, Lakeville, MN (US); Edward John Silha, Austin, TX (US); Kenichi Tsuchiya, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/948,776

(22) Filed: Sep. 23, 2004

(65) Prior Publication Data

US 2005/0091476 A1   Apr. 28, 2005

Related U.S. Application Data

(62) Division of application No. 10/175,626, filed on Jun. 20, 2002, now Pat. No. 6,829,684, which is a division of application No. 09/346,206, filed on Jul. 1, 1999, now Pat. No. 6,438,671.

(51) Int. Cl.
*G06F 9/50* (2006.01)

(52) U.S. Cl. ............... 712/200; 712/43; 712/229; 718/200

(58) Field of Classification Search ............ 712/33, 712/225, 227, 229; 718/104
See application file for complete search history.

(56) References Cited

U.S. PATENT DOCUMENTS

| 4,769,770 A | | 9/1988 | Miyadera et al. ............ 711/206 |
|---|---|---|---|
| 4,847,806 A | * | 7/1989 | Bergman ...................... 713/1 |
| 5,513,337 A | | 4/1996 | Gillespie et al. ............ 711/152 |
| 5,561,784 A | | 10/1996 | Chen et al. .................. 711/157 |
| 5,696,913 A | | 12/1997 | Gove et al. .................. 710/317 |
| 5,845,129 A | | 12/1998 | Wendorf et al. ............ 710/200 |
| 6,078,983 A | * | 6/2000 | Hanawa et al. ............. 710/240 |
| 6,161,166 A | | 12/2000 | Doing et al. ................. 711/125 |
| 6,363,453 B1 | * | 3/2002 | Esposito et al. ............... 711/2 |
| 6,708,242 B1 | * | 3/2004 | Monia et al. ................ 710/300 |
| 2002/0069335 A1 | * | 6/2002 | Flylnn, Jr. .................. 711/153 |

OTHER PUBLICATIONS

Soltis, Frank, "Logical Partitioning: Divide and Conquer", News400, Jan. 1999, pp. 21-22. (USA).

* cited by examiner

*Primary Examiner*—Kenneth S. Kim
(74) *Attorney, Agent, or Firm*—Roy W. Truelson

(57) ABSTRACT

A processor supports logical partitioning of hardware resources including real address spaces of a computer system. An ultra-privileged supervisor process, called a hypervisor, regulates the logical partitions and can dynamically re-allocate resources. Preferably, the processor supports hardware multithreading, each thread independently capable of being in either hypervisor, supervisor, or problem state, and is capable of entering hypervisor state only upon occurrence of certain pre-defined events. A logical partition identifier is stored in a processor register, and can be altered by the processor only when in hypervisor state. Certain bus communications contain a logical partition identifier tag, and the processor ignores such communications if the tag does not match its own logical partition identifier in its register.

18 Claims, 9 Drawing Sheets

APPARATUS FOR SUPPORTING A LOGICALLY PARTITIONED COMPUTER SYSTEM

CROSS REFERENCE TO RELATED APPLICATIONS

This is a divisional application of U.S. patent application Ser. No. 10/175,626, filed Jun. 20, 2002, entitled "APPARATUS FOR SUPPORTING A LOGICALLY PARTITIONED COMPUTER SYSTEM", which is a divisional application of U.S. patent application Ser. No. 09/346,206, filed Jul. 1, 1999, now issued U.S. Pat. No. 6,829,684, originally entitled "APPARATUS FOR SUPPORTING A LOGICALLY PARTITIONED COMPUTER SYSTEM", and by subsequent amendment entitled "GENERATING PARTITION CORRESPONDING REAL ADDRESS IN PARTITIONED MODE SUPPORTING SYSTEM", now issued as U.S. Pat. No. 6,438,671 to Doing et al., both of which are herein incorporated by reference.

The present application is also related to the following U.S. patents and commonly assigned patent applications, all of which are herein incorporated by reference:

U.S. Pat. No. 6,467,007 to Armstrong et al., entitled Processor Reset Generated Via Memory Access Interrupt.

U.S. Pat. No. 6,681,240 to Armstrong et al., entitled Apparatus and Method for Specifying Maximum Interactive Performance in a Logical Partition of a Computer.

U.S. Ser. No. 09/314,324, filed May 19, 1999, entitled Management of a Concurrent Use License in a Logically Partitioned Computer (Assignee's docket no. RO999-023).

U.S. Pat. No. 6,691,146 to Armstrong et al., entitled Logical Partition Manager and Method.

U.S. Pat. No. 6,279,046 to Armstrong et al., entitled Event-Driven Communications Interface for Logically-Partitioned Computer.

U.S. Pat. No. 6,161,166 to Doing et al., entitled Instruction Cache for Multithreaded Processor.

U.S. Pat. No. 6,263,404 to Borkenhagen et al., entitled Accessing Data from a Multiple Entry Fully Associative Cache Buffer in a Multithread Data Processing System.

U.S. Pat. No. 6,021,481 to Eickemeyer et al., entitled Effective-To-RealAddress Cache Managing Apparatus and Method.

U.S. Pat. No. 6,212,544 to Borkenhagen et al., entitled Altering Thread Priorities in a Multithreaded Processor.

U.S. Pat. No. 6,697,935 to Borkenhagen et al., entitled Method and Apparatus for Selecting Thread Switch Events in a Multithreaded Processor.

U.S. Pat. No. 6,567,839 to Borkenhagen et al., entitled Thread Switch Control in a Multithreaded Processor System.

U.S. Pat. No. 6,105,051 to Borkenhagen et al., entitled An Apparatus and Method to Guarantee Forward Progress in a Multithreaded Processor.

U.S. Pat. No. 6,076,157 to Borkenhagen et al., entitled Method and Apparatus To Force a Thread Switch in a Multithreaded Processor.

U.S. Pat. No. 6,088,788 to Borkenhagen et al., entitled Background Completion of Instruction and Associated Fetch Request in a Multithread Processor.

FIELD OF THE INVENTION

The present invention relates generally to digital data processing, and more particularly to support within a processing unit for logically partitioning of a digital computer system.

BACKGROUND OF THE INVENTION

A modern computer system typically comprises a central processing unit (CPU) and supporting hardware necessary to store, retrieve and transfer information, such as communications busses and memory. It also includes hardware necessary to communicate with the outside world, such as input/output controllers or storage controllers, and devices attached thereto such as keyboards, monitors, tape drives, disk drives, communication lines coupled to a network, etc. The CPU is the heart of the system. It executes the instructions which comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Programs which direct a computer to perform massive numbers of these simple operations give the illusion that the computer is doing something sophisticated. What is perceived by the user as a new or improved capability of a computer system is made possible by performing essentially the same set of very simple operations, but doing it much faster. Therefore continuing improvements to computer systems require that these systems be made ever faster.

The overall speed of a computer system (also called the "throughput") may be crudely measured as the number of operations performed per unit of time. Conceptually, the simplest of all possible improvements to system speed is to increase the clock speeds of the various components, and particularly the clock speed of the processor. E.g., if everything runs twice as fast but otherwise works in exactly the same manner, the system will perform a given task in half the time. Early computer processors, which were constructed from many discrete components, were susceptible to significant speed improvements by shrinking component size, reducing component number, and eventually, packaging the entire processor as an integrated circuit on a single chip. The reduced size made it possible to increase the clock speed of the processor, and accordingly increase system speed.

Despite the enormous improvement in speed obtained from integrated circuitry, the demand for ever faster computer systems has continued. Hardware designers have been able to obtain still further improvements in speed by greater integration (i.e., increasing the number of circuits packed onto a single chip), by further reducing the size of the circuits, and by various other techniques. However, designers can see that physical size reductions can not continue indefinitely, and there are limits to their ability to continue to increase clock speeds of processors. Attention has therefore been directed to other approaches for further improvements in overall speed of the computer system.

Without changing the clock speed, it is possible to improve system throughput by using multiple processors. The modest cost of individual processors packaged on integrated circuit chips has made this practical. While there are certainly potential benefits to using multiple processors, numerous additional architectural issues are introduced. In particular, multiple processors typically share the same main memory (although each processor may have it own cache). It is necessary to devise mechanisms that avoid memory access conflicts. For example, if two processors have the capability to concurrently read and update the same data, there must be mechanisms to assure that each processor has authority to access the data, and that the resulting data is not gibberish. Without delving into further architectural complications of multiple processor systems, it can still be observed that there are many reasons to improve the speed of the individual CPU, whether or not a system uses multiple CPUs or a single CPU. If the CPU clock speed is given, it is possible to further increase the speed of the individual CPU, i.e., the number of operations executed per second, by increasing the average number of operations executed per clock cycle.

In order to boost CPU speed, it is common in high performance processor designs to employ instruction pipelining, as well as one or more levels of cache memory. Pipeline instruction execution allows subsequent instructions to begin execution before previously issued instructions have finished. Cache memories store frequently used and other data nearer the processor and allow instruction execution to continue, in most cases, without waiting the full access time of a main memory.

Pipelines will stall under certain circumstances. An instruction that is dependent upon the results of a previously dispatched instruction that has not yet completed may cause the pipeline to stall. For instance, instructions dependent on a load/store instruction in which the necessary data is not in the cache, i.e., a cache miss, cannot be executed until the data becomes available in the cache. Maintaining the requisite data in the cache necessary for continued execution and to sustain a high hit ratio, i.e., the number of requests for data compared to the number of times the data was readily available in the cache, is not trivial especially for computations involving large data structures. A cache miss can cause the pipelines to stall for several cycles, and the total amount of memory latency will be severe if the data is not available most of the time. Although memory devices used for main memory are becoming faster, the speed gap between such memory chips and high-end processors is becoming increasingly larger. Accordingly, a significant amount of execution time in current high-end processor designs is spent waiting for resolution of cache misses.

It can be seen that the reduction of time the processor spends waiting for some event, such as re-filling a pipeline or retrieving data from memory, will increase the average number of operations per clock cycle. One architectural innovation directed to this problem is called "multithreading". This technique involves breaking the workload into multiple independently executable sequences of instructions, called threads. At any instant in time, the CPU maintains the state of multiple threads. As a result, it is relatively simple and fast to switch threads.

The term "multithreading" as defined in the computer architecture community is not the same as the software use of the term which means one task subdivided into multiple related threads. In the architecture definition, the threads may be independent. Therefore "hardware multithreading" is often used to distinguish the two uses of the term. As used herein, "multithreading" will refer to hardware multithreading.

There are two basic forms of multithreading. In the more traditional form, sometimes called "fine-grained multithreading", the processor executes N threads concurrently by interleaving execution on a cycle-by-cycle basis. This creates a gap between the execution of each instruction within a single thread, which removes the need for the processor to wait for certain short term latency events, such as re-filling an instruction pipeline. In the second form of multithreading, sometimes called "coarse-grained multithreading", multiple instructions in a single thread are sequentially executed until the processor encounters some longer term latency event, such as a cache miss.

Typically, multithreading involves replicating the processor registers for each thread in order to maintain the state of multiple threads. For instance, for a processor implementing the architecture sold under the trade name PowerPC™ to perform multithreading, the processor must maintain N states to run N threads. Accordingly, the following are replicated N times: general purpose registers, floating point registers, condition registers, floating point status and control register, count register, link register, exception register, save/restore registers, and special purpose registers. Additionally, the special buffers, such as a segment lookaside buffer, can be replicated or each entry can be tagged with the thread number and, if not, must be flushed on every thread switch. Also, some branch prediction mechanisms, e.g., the correlation register and the return stack, should also be replicated. However, larger hardware structures such as caches and execution units are typically not replicated.

In a computer system using multiple CPUs (symmetrical multi-processors, or SMPs), each processor supporting concurrent execution of multiple threads, the enforcement of memory access rules is a complex task. In many systems, each user program is granted a discrete portion of address space, to avoid conflicts with other programs and prevent unauthorized accesses. However, something must allocate addresses in the first place, and perform other necessary policing functions. Therefore, special supervisor programs exist which necessarily have access to the entire address space. It is assumed that these supervisor programs contain "trusted" code, which will not disrupt the operation of the system. In the case of a multiprocessor system, it is possible that multiple supervisor programs will be running on multiple SMPs, each having extraordinary capability to access data addresses in memory. While this does not necessarily mean that data will be corrupted or compromised, avoidance of potential problems adds another layer of complexity to the supervisor code. This additional complexity can adversely affect system performance. To the extent hardware within each SMP can assist software supervisors, performance can be improved.

In a large multiprocessor system, it may be desirable to partition the system into one or more smaller logical SMPs, an approach known as logical partitioning. In addition, once a system is partitioned it may be desirable to dynamically re-partition the system based on changing requirements. It is possible to do this using only software. The additional complexity this adds to the software can adversely affect system performance. Logical partitioning of a system would be more effective if hardware support were provided to assist the software. Hardware support may be useful to help software isolate one logical partition from another. Said differently, hardware support may be used to prevent work being performed in one logical partition from corrupting work being performed in another. Hardware support would also be useful for dynamically re-partitioning the system in an efficient manner. This hardware support may be used to enforce the partitioning of system resources such as processors, real memory, internal registers, etc.

SUMMARY OF THE INVENTION

It is therefore an object of the present invention to provide an improved processor apparatus.

Another object of this invention is to provide greater support, and in particular hardware support, for logical partitioning of a computer system.

Another object of this invention is to provide an apparatus having greater hardware regulation of memory access in a processor.

Another object of this invention is to increase the performance of a computer system having multiple processors.

Another object of the invention is to improve multithreaded processor hardware control for logical partitioning of a computer system.

A processor provides hardware support for logical partitioning of a computer system. Logical partitions isolate the real address spaces of processes executing on different processors, specifically, supervisory processes. An ultra-privileged supervisor process, called a hypervisor, regulates the logical partitions.

In the preferred embodiment, the processor contains multiple register sets for supporting the concurrent execution of multiple threads (i.e., hardware multithreading). Each thread is capable of independently being in either hypervisor, supervisor or problem (non-privileged) state.

In the preferred embodiment, each processor generates effective addresses from executable code, which are translated to real addresses corresponding to locations in physical main memory. Certain processes, particularly supervisory processes, may optionally run in a special (effective address equals real address) mode. In this mode, real addresses are constrained within a logical partition by effectively concatenating certain high order bits from a special register (real memory offset register) with lower order bits of the effective address. For clarity, the effective address in effective=real mode is referred to herein as a base real address, while the resultant address after partitioning is referred to as a partitioned real address. Logical partitioning of the address space amounts to an enforced constraint on certain high order address bits, so that within any given partition these address bits are the same. Partitioning is thus distinguished from typical address translation, wherein a range of effective addresses is arbitrarily correlated a range of real addresses. The hardware which partitions a real address is actually a set of OR gates which perform a logical OR of the contents of the real memory offset register with an equal number of high order bits of effective address (base real address). By convention, the high order bits of effective address (i.e., in the base real address) which are used constrain the address to a logical partition should be 0. A separate range check mechanism concurrently verifies that these high order effective address bits are in fact 0, and generates a real address space check signal if they are not.

In the preferred embodiment, the range check mechanism includes a 2-bit real memory limit register, and a set of logic gates. The limit register specifies the number of high order effective address (base real address) bits which must be zero (i.e., the size of the logical partition memory resource). The limit register value generates a mask, which is logically ANDed with selected bits of the effective address. The resulting bits are then logically ORed together to generate the real address space check signal. The use of this limit register mechanism supports logically partitioned memory spaces of different sizes.

In the preferred embodiment, instruction addresses can be pre-fetched in anticipation of execution. In particular, dormant thread instructions may be pre-fetched while another thread is processing and executing instructions. The partitioning mechanism checks and controls instruction pre-fetching independently of the actively running thread.

In the preferred embodiment, special operating system software running in hypervisor state can dynamically re-allocate resources to logical partitions. In particular, it can alter the contents of the real memory offset register and the real memory limit register which regulate the generation of partitioned real addresses; a logical partition identifier which identifies the logical partition to which a processor is assigned; and certain configuration information.

In the preferred embodiment, the processor supports different systems which use the hypervisor, supervisor and problem states differently. Thus, one mode of operation supports effective=real addressing mode in any state, but addresses are partitioned and checked as described above when operating in non-hypervisor state. A second mode of operation supports effective=real addressing mode in only the hypervisor state.

The enforcement of logical partitioning by processor hardware which intercepts a base real address and converts it to a partitioned real address removes the need for low-level operating system software to verify certain address constraints among multiple processors and threads, reducing the burden on operating system software and improving system performance.

Other objects, features and characteristics of the present invention; methods, operation, and functions of the related elements of the structure; combination of parts; and the like will become apparent from the following detailed description of the preferred embodiments and accompanying drawings, all of which form a part of this specification, wherein like reference numerals designate corresponding parts in the various figures.

DETAILED DESCRIPTION OF THE PREFERRED EMBODIMENTS

Figure 1:
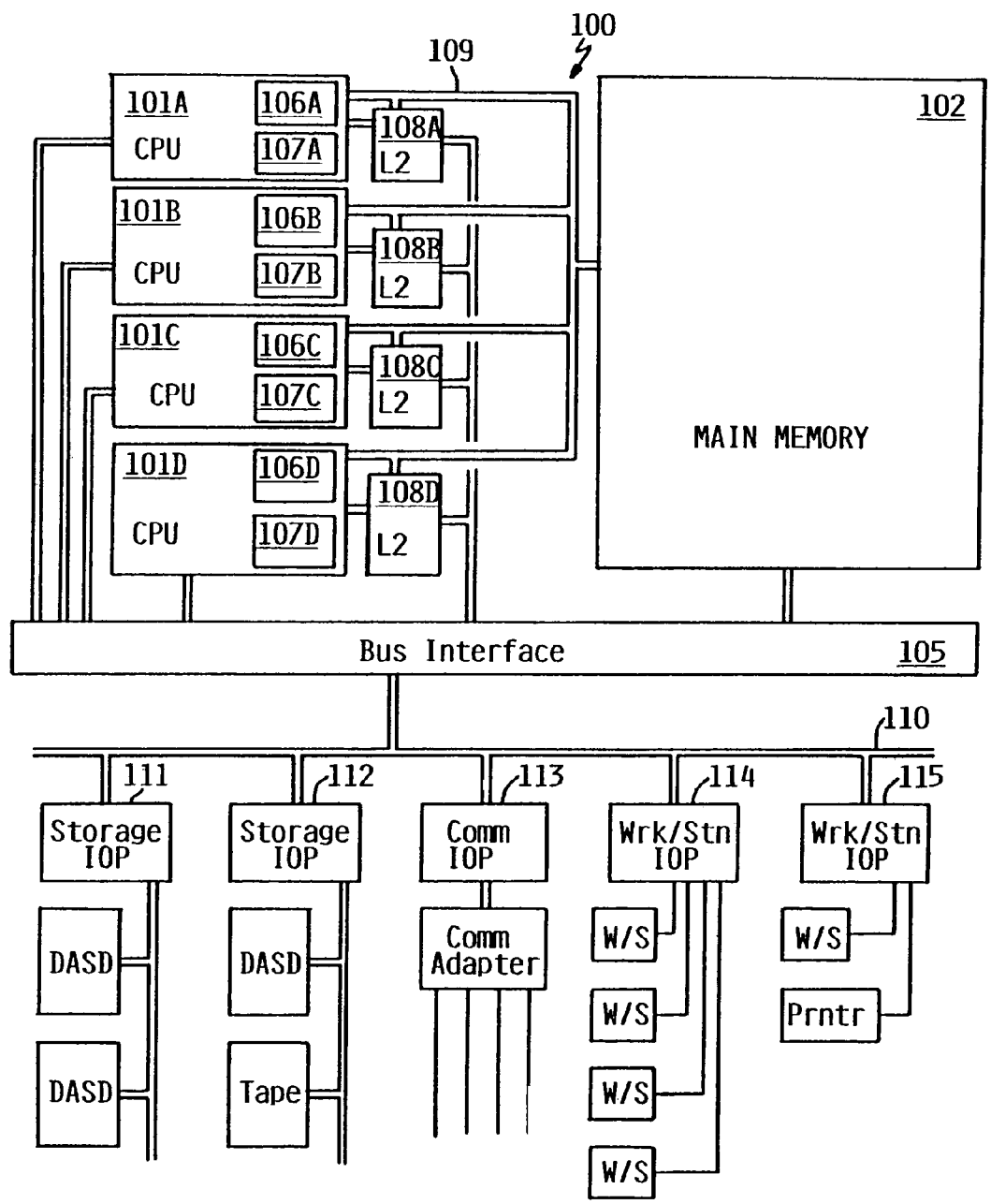
FIG. 1 is a high-level block diagram of the major hardware components of a computer system having multiple CPUs, according to the preferred embodiment of the invention described herein.

The major hardware components of a multiprocessor computer system 100 for utilizing the logical partitioning architecture according to the preferred embodiment of the present invention are shown in FIG. 1. CPUs 101A, 101B, 101C and 101D for processing instructions contains separate respective internal level one instruction caches 106A, 106B, 106C, 106D (L1 I-cache) and level one data caches 107A, 107B, 107C, 107D (L1 D-cache). Each L1 I-cache 106A, 106B, 106C, 106D stores instructions for execution by its CPU 101A, 101B, 101C, 101D. L1 D-cache stores data (other than instructions) to be processed by a CPU. Each CPU 101A, 101B, 101C, 101D is coupled to a respective level two cache (L2 cache) 108A, 108B, 108C, 108D, which can be used to hold both instructions and data. Memory bus 109 transfers data between L2 caches or CPU on the one hand and main memory 102 on the other. CPUs 101A, 101B, 101C, 101D, L2 cache 108A, 108B, 108C, 108D and main memory 102 also communicate via bus interface 105 with system bus 110. Various I/O processing units (IOPs) 111–115 attach to system bus 110 and support communication with a variety of storage and I/O devices, such as direct access storage devices (DASD), tape drives, workstations, printers, and remote communication lines for communicating with remote devices or other computer systems. For simplicity, CPU, L1 I-cache, L1 D-cache, and L2 cache are herein designated generically by reference numbers 101, 106, 107 and 108, respectively. While various buses are shown in FIG. 1, it should be understood that these are intended to represent various communications paths at a conceptual level, and that the actual physical configuration of buses may vary.

Figure 2:
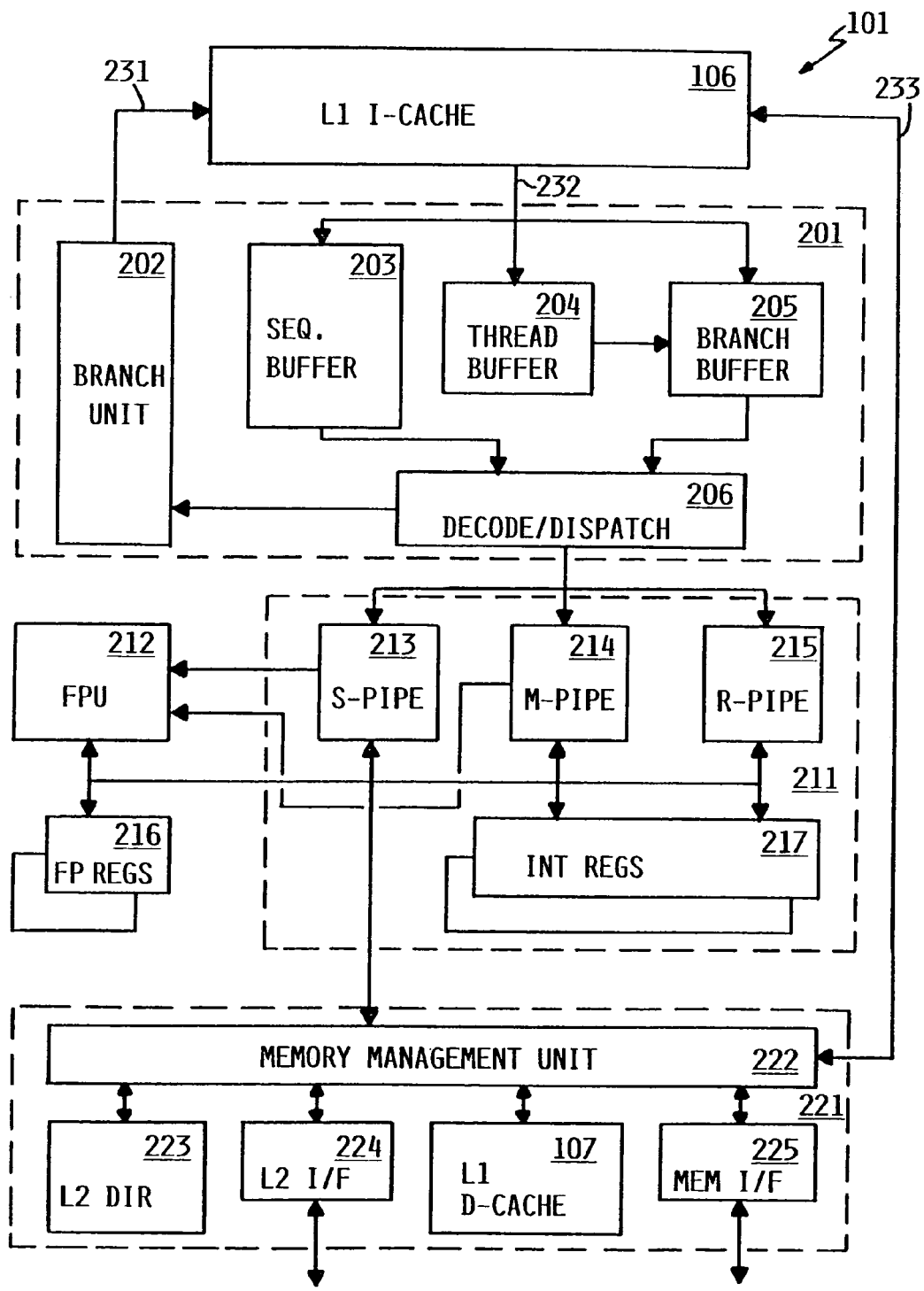
FIG. 2 is a high-level diagram of a central processing unit of a computer system according to the preferred embodiment.

In the preferred embodiment, each CPU is capable of maintaining the state of two threads, and switches execution between threads on certain latency events. I.e., CPU executes a single thread (the active thread) until some latency event is encountered which would force the CPU to wait, (a form of coarse-grained multithreading). Thread switching conditions and mechanisms are described in greater detail in U.S. Pat. No. 6,212,544, U.S. Pat. No. 6,105,051, U.S. Pat. No. 6,076,157, U.S. Pat. No. 6,697,935 and U.S. Pat. No. 6,567,839, incorporated herein by reference. However, it should be understood that the present invention could be practiced with a different number of thread states in each CPU, and that it would be possible to interleave execution of instructions from each thread on a cycle-by-cycle basis (fine-grained multithreading), or to switch threads on some different basis. FIG. 2 is a high level diagram of the major components of CPU 101, showing CPU 101 in greater detail than is depicted in FIG. 1, according to the preferred embodiment. In this embodiment, the components shown in FIG. 2 are packaged on a single semiconductor chip. CPU 101 includes instruction unit portion 201, execution unit portion 211 and 212, and storage control portion 221. In general, instruction unit 201 obtains instructions from L1 I-cache 106, decodes instructions to determine operations to perform, and resolves branch conditions to control program flow. Execution unit 211 performs arithmetic and logical operations on data in registers, and loads or stores data. Storage control unit 221 accesses data in the L1 data cache or interfaces with memory external to the CPU where instructions or data must be fetched or stored.

Instruction unit 201 comprises branch unit 202, buffers 203, 204, 205, and decode/dispatch unit 206. Instructions from L1 I-cache 106 are loaded into one of the three buffers from L1 I-Cache instruction bus 232. Sequential buffer 203 stores 16 instructions in the current execution sequence. Branch buffer 205 stores 8 instructions from a branch destination; these are speculatively loaded into buffer 205 before branch evaluation, in the event the branch is taken. Thread switch buffer 204 stores 8 instructions for the inactive thread; in the event a thread switch is required from the currently active to the inactive thread, these instructions will be immediately available. Decode/dispatch unit 206 receives the current instruction to be executed from one of the buffers, and decodes the instruction to determine the operation(s) to be performed or branch conditions. Branch unit 202 controls the program flow by evaluating branch conditions, and refills buffers from L1 I-cache 106 by sending an effective address of a desired instruction on L1 I-Cache address bus 231.

Execution unit 211 comprises S-pipe 213, M-pipe 214, R-pipe 215 and a bank of general purpose registers 217. Registers 217 are divided into two sets, one for each thread. R-pipe is a pipelined arithmetic unit for performing a subset of integer arithmetic and logic functions for simple integers. M-pipe 214 is a pipelined arithmetic unit for performing a larger set of arithmetic and logic functions. S-pipe 213 is a pipelined unit for performing load and store operations. Floating point unit 212 and associated floating point registers 216 are used for certain complex floating point operations which typically require multiple cycles. Like general purpose registers 217, floating point registers 216 are divided into two sets, one for each thread.

Storage control unit 221 comprises memory management unit 222, L2 cache directory 223, L2 cache interface 224, L1 data cache 107, and memory bus interface 225. L1 D-cache is an on-chip cache used for data (as opposed to instructions). L2 cache directory 223 is a directory of the contents of L2 cache 108. L2 cache interface 224 handles the transfer of data directly to and from L2 cache 108. Memory bus interface 225 handles the transfer of data across memory bus 109, which may be to main memory 102 or to L2 cache units associated with other CPUs. Memory management unit 222 is responsible for routing data accesses to the various units. E.g., when S-pipe 213 processes a load command, requiring data to be loaded to a register, memory management unit may fetch the data from L1 D-cache 107, L2 cache 108, or main memory 102. Memory management unit 222 determines where to obtain the data. L1 D-cache 107 is directly accessible, as is the L2 cache directory 223, enabling unit 222 to determine whether the data is in either L1 D-cache 107 or L2 cache 108. If the data is in neither on-chip L1 D-cache nor L2 cache 108, it is fetched from memory bus 109 using memory interface 225.

While various CPU components have been described and shown at a high level, it should be understood that the CPU of the preferred embodiment contains many other components not shown, which are not essential to an understanding of the present invention. For example, various additional special purpose registers will be required in a typical design, some of which must be replicated for each thread. It should also be understood that the number, type and arrangement of components within CPU 101 could be varied. For example, the number and configuration of buffers and caches may vary; the number and function of execution unit pipelines may vary; registers may be configured in different arrays and sets; dedicated floating point processing hardware may or may not be present; etc.

CPU 101 of the preferred embodiment supports multiple levels of address translation, as logically illustrated in FIG.

8. The three basic addressing constructs are effective address 801, virtual address 802, and real address 803. An "effective address" refers to the address from the point of view of the executable code, i.e., it is an instruction address generated by instruction unit 201, or a data address generated by execution unit 211. An effective address may be produced in any of various ways known in the art, e.g., as a concatenation of some high-order address bits in a special-purpose register (which changes infrequently, e.g., when execution of a new task is initiated) and lower order address bits from an instruction; as a computed offset from an address in a general purpose register; as an offset from the currently executing instruction; etc., as illustrated in greater detail in FIG. 7, explained below. In this embodiment, an effective address comprises 64 bits, numbered 0 to 63 (0 being the highest order bit). A "virtual address" is an operating system construct, used to isolate the address spaces of different users. I.e., if each user may reference the full range of effective addresses, then the effective address spaces of different users must be mapped into a larger virtual address space to avoid conflicts. The virtual address is not a physical entity in the sense that it is stored in registers; it is a logical construction, resulting from a concatenation of a 52-bit virtual segment ID 814 and the low-order 28 bits of the effective address, a total of 80 bits. A "real address" refers to a physical location in memory 102 where the instruction or data is stored. The real address comprises 40 bits numbered 24 to 63 (24 being the highest order bit).

Figure 8:
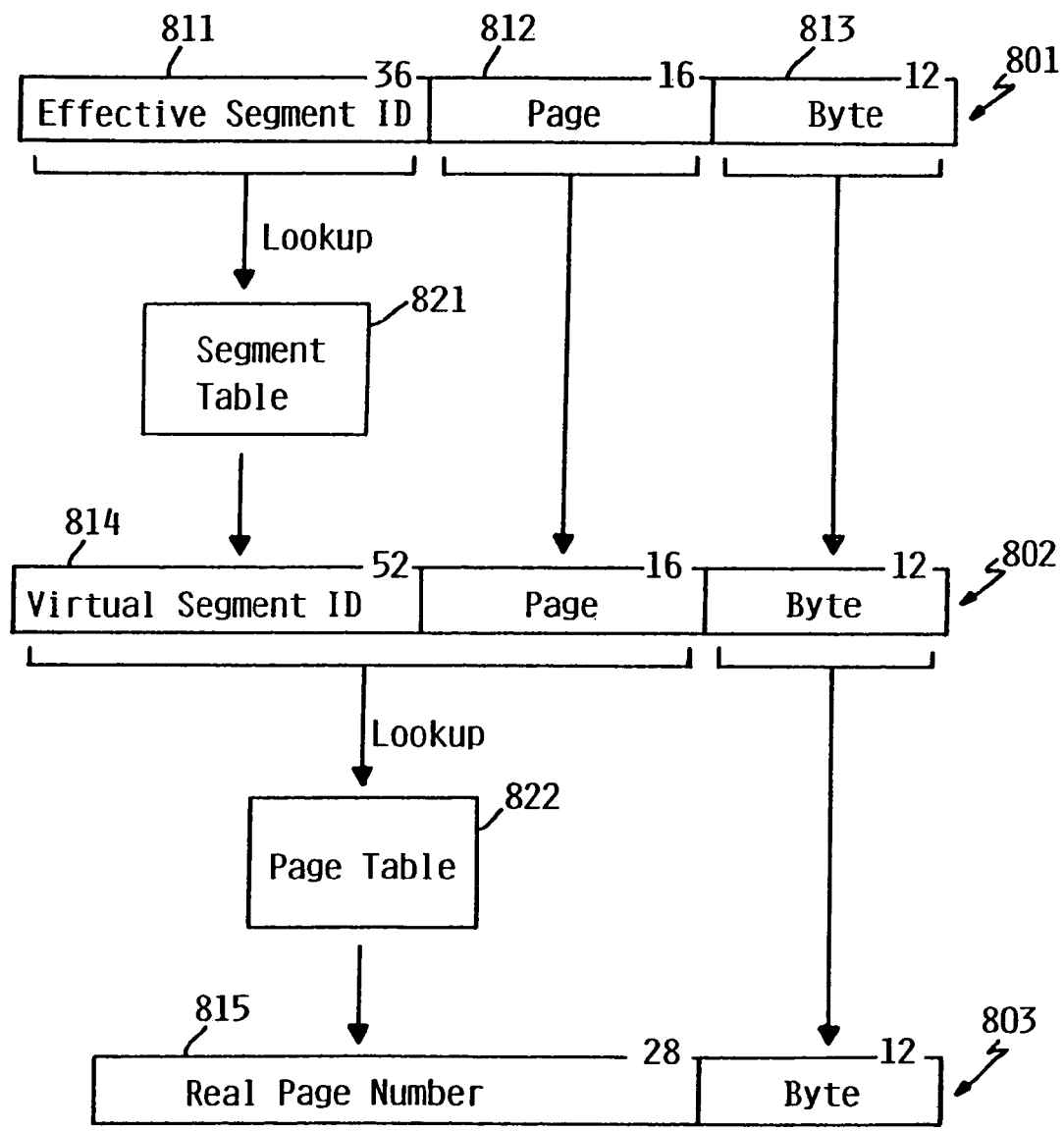
FIG. 8 is a logical illustration of address translation, according to the preferred embodiment.

As shown in FIG. 8, an effective address 801 comprises 36-bit effective segment ID 811, 16-bit page number 812, and 12-bit byte index 813, the effective segment ID occupying the highest order bit positions. A virtual address 802 is constructed from an effective address by mapping the 36-bit effective segment ID 811 to a 52-bit virtual segment ID 814, and concatenating the resultant virtual segment ID 814 with page number 812 and byte index 813. A real address 803 is derived from the virtual address by mapping the virtual segment ID 814 and page number 812 to a 28-bit real page number 815, and concatenating the real page number with byte index 813. Because a page of main memory contains 4K (i.e., $2^{12}$) bytes, the byte index 813 (lowest order 12 address bits) specifies an address within a page, and is the same whether the address is effective, virtual or real. The higher order bits specify a page, and are therefore sometimes referred to as an "effective page number" or "real page number", as the case may be.

Computer system 100 contains an address translation mechanism for translating effective addresses generated by CPU 101 to real addresses in memory 102. This address translation mechanism includes a segment table mechanism 821 for mapping effective segment ID 811 to virtual segment ID 814, and a page table mechanism 822 for mapping virtual segment ID 814 and page number 812 to real page number 815. While these mechanisms are shown in FIG. 8 as single entities for illustrative purposes, they in fact comprise multiple tables or register at different levels. I.e., a complete page table and a complete segment table reside in main memory 102, while various smaller cached portions of the data in these tables is contained in CPU 101 itself or the L2 cache. There are additional translation mechanisms (not shown) which will in limited circumstances translate directly from an effective to a real address.

While CPU 101 supports address translation as illustrated in FIG. 8, it also supports more simple addressing. Specifically, one of the operating modes is a "tags active" mode, in which effective addresses are the same as virtual addresses (i.e., an effective segment ID 811 maps directly to virtual segment ID 814 without lookup, so that the high-order 16 bits of virtual segment ID are always 0). CPU 101 may also operate in an effective=real addressing mode.

Effective=real mode (E=R) is a special addressing mode, typically reserved for certain low level operating system functions which operate more efficiently if always stored at the same real address locations. These operating system functions may need to access reserved areas of memory, and therefore typically execute in a special privileged state (as opposed to most user executable code, which executes in a non-privileged state called a "problem state"). These operating system functions are created and tested by a process assumed to be trusted, in the sense that the resulting code will not cause unauthorized interference with machine processes. When executing in E=R mode and without logical partitioning, the lower order 40 bits of effective address (i.e., $EA_{24:63}$) generated by instruction unit 201 (in the case of instructions) or execution unit 211 (in the case of data) is the same as the real address ($RA_{24:63}$); the high order effective address bits are assumed to be 0. When operating in E=R mode, addresses are not translated, i.e., the page table mechanism and segment table mechanism, described above, along with any associated caches, are not used. This has the effect of mapping all E=R mode processes to the same real memory, even when executing on different processors. E=R mode addressing is active when either (a) an applicable address translate bit in one of the machine state registers is set off, or (b) under certain circumstances, when the effective address lies within a special reserved range of addresses. Appropriate hardware logic (not shown) detects these conditions and generates an E=R control signal for use by addressing logic.

In the preferred embodiment, computer system 100 can be logically partitioned. Logical partitioning means that the system is logically divided into multiple subsets called logical partitions, and some of the system resources are assigned to particular logical partitions, while other resources are shared among partitions. In the preferred embodiment, processors and real memory are assigned to logical partitions in a partitioned system, while buses, I/O controllers, and I/O devices are shared, it being understood that it would be possible to assign different types and mixtures of devices to partitions. In a logically partitioned system, each processor of the multiprocessor system is assigned to a partition, along with a subset of the real memory address space. With limited exceptions (explained below), tasks executing on a processor can only access real memory within that processor's subset of the real memory address space. This has the effect of isolating tasks executing on different processors in different logical partitions. From the standpoint of CPU and memory, the logically partitioned multiprocessor computer system behaves very much like multiple separate computer systems. This avoids some of the contention and other overhead issues associated with prior art multiprocessor systems. At the same time, the different logical partitions share hardware resources such as disk storage and I/O, as well as certain low level software resources. Thus, many of the advantages of a multiprocessor system over multiple discrete single processor systems are maintained. Furthermore, it is possible for multiple processors to share a single logical partition. For example, a computer system containing 16 processors could be configured in four logical partitions, each containing four processors, and resembling in certain characteristics the performance of four 4-way multiprocessor systems as opposed to a single 16-way multiprocessor system.

Since user executable (non-privileged) code is typically translated as described above from an effective address to a real address (with or without the intermediate virtual address), this same basic mechanism can be used to support logical partitioning. The operating system will assign a block of user-accessible address space to a block of real memory address space lying within the logical partition of the processor executing the user code. Subsequent references to an effective address within this block will be translated using the translation mechanisms to the corresponding block of real memory address space. Thus, user executable code will reference something within the logical partition of the processor, without affecting memory outside the processor's logical partition.

However, the translation mechanism can not enforce logical partitioning of address references in E=R mode. Generally, this is privileged code, created using a trusted process. Even though the code is created using a trusted process, there are performance reasons to isolate such code executing on different processors to different logical partitions. At the same time, there is still a need for some operating system functions to have access to the entire real memory.

To support logical partitioning, two privileged execution states are defined, in addition to the non-privileged "problem state". The privileged execution states are called "supervisor state" and "hypervisor state". Most privileged functions execute in the supervisor state, and are confined to the logical partition of the processor upon which they are executing. Supervisor state code may be untranslated, in which case the high-order effective address bits are directly manipulated by hardware to confine address references to the logical partition of the executing processor. In this manner, duplicates of these functions can concurrently execute on different processors in different logical partitions, without concern for the effect on other logical partitions. Only a select few functions, such as those which support logical partitioning itself, execute in the ultra-privileged hypervisor state, and have access to the full real address space of computer system 100. Each executing thread has its own privilege state (either hypervisor, supervisor, or problem), which is independent of the privilege state associated with any other thread.

Figure 9:
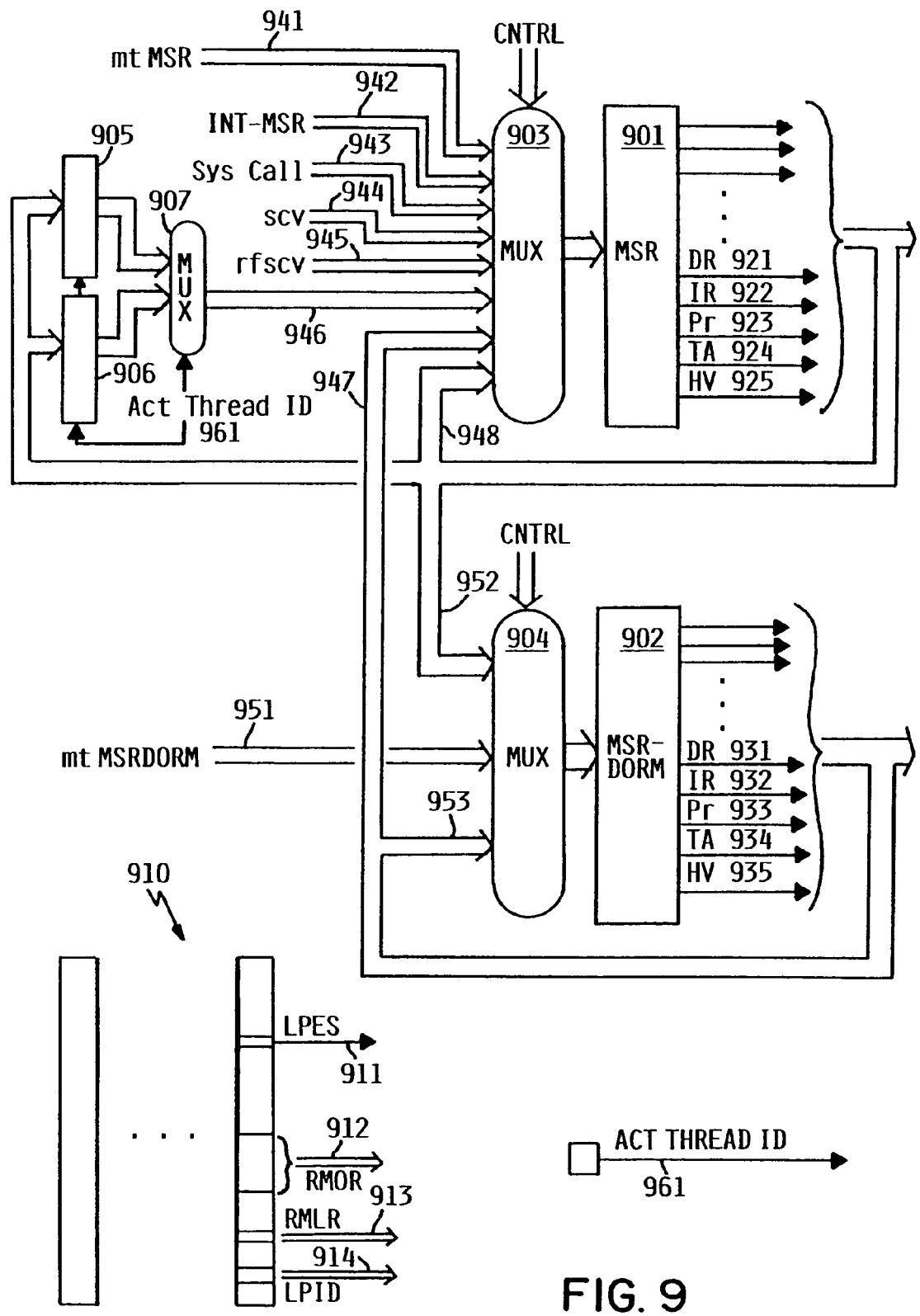
FIG. 9 illustrates the operation of certain state and configuration registers, according to the preferred embodiment.

Processor state and configuration information is maintained in a set of special-purpose registers. FIG. 9 illustrates some of these registers and associated control structures. The key register is Active-Thread Machine State Register (MSR) 901, which maintains certain state information for the currently active thread. Dormant-Thread Machine State Register (MSRDorm) 902 maintains the same type of information for the currently dormant thread. Each register 901, 902 contains the following respective bits, among others:

DR bit, which indicates the corresponding thread's data addresses should be translated;

IR bit, which indicates the corresponding thread's instruction addresses should be translated;

Pr bit, which indicates whether the corresponding thread is in problem state;

TA bit, which indicates "tags active" mode.

HV bit, which indicates the corresponding thread is in hypervisor state;

FIG. 9 illustrates respective data relocate (DR) signal lines 921, 931; instruction relocate (IR) signal lines 922, 932; problem state signal lines 923, 933; tags active signal lines 924, 934; and hypervisor state signal lines 925, 935.

A machine state register is not permanently associated with a thread; rather, there is one physical register 901 which always contains the information for the active thread, and another which contains the dormant thread's information. For this reason, an Active Thread Identifier bit 961 is needed to identify which is the active or dormant thread. ActThreadID bit 961 is kept in a separate special register. Upon a thread switch, the contents of registers 901 and 902 are swapped, and ActThreadID bit 961 is changed. Swapping register contents simplifies downstream control mechanisms, since in most cases only the contents of the active thread MSR 901 are relevant.

As shown in FIG. 9, input to each machine state register 901, 902 is controlled by a respective multiplexer 903, 904, which receives inputs from various sources. The inputs to multiplexer 903 illustrate the various ways in which MSR 901 can be altered. Input path 941 represents a move to MSR (mtMSR) instruction, i.e., MSR 901 can be altered by executing a special mtMSR instruction while in a privileged state, which causes data to be loaded directly from a general purpose register into the MSR. Input path 942 represents an interrupt state, i.e., upon occurrence of an interrupt condition, the MSR is automatically loaded with a predefined state associated with the interrupt. Input paths 943 and 944 represent a System Call and a System Call Vectored, respectively. These are special processor instructions, typically made while in the problem state in order to invoke a privileged state. Both cause a predefined state to be loaded into MSR and a jump to a predefined location. System Call Vectored does not affect as many bits in the MSR as does System Call, i.e., System Call Vectored causes only a few bits to change, most of the bits being simply copied from their current state. Return from System Call Vectored (rfscv) path 945 represents reloading the MSR with its previous state upon return from a System Call Vectored; these values are stored in a special register (not shown). Return from interrupt/system call path 946 is conceptually similar to rfscv 945, and represents reloading the MSR with its previous state upon return from an interrupt or a System Call. The previous state of the MSR is saved in SRR1 registers 905, 906, which are special purpose registers for holding a saved state. One SRR1 register is associated with each thread, and the state of MSR 901 is saved to the register associated with the currently active thread as identified by ActThreadID 961. Upon return from an interrupt or System Call, multiplexer 907 selects the appropriate register 905 or 906 for restoring the previous MSR state. Input path 947 represents the contents of MSRDorm 902, which is loaded into MSR 901 upon a thread switch. Input path 948 represents the current contents of MSR 901; because some of the events which cause changes to MSR 901 do not affect all bits, this path represents a copying of non-affected bits back into MSR 901.

MSRDorm 902 is altered in similar fashion, although fewer paths are shown in FIG. 9 because an interrupt, System Call, or System Call Vectored can apply only to the currently active thread. Like MSR 901, MSRDorm902 can be altered by a special move to MSRDorm instruction, as represented by path 951. MSRDorm will receive the contents of MSR 901 upon a thread switch, as represented by path 952. Finally, path 953 represents copying bits not affected by a change back into MSRDorm 902.

Also shown in FIG. 9 is a set of configuration registers 910. Unlike MSR 901 and MSRDorm 902, these registers contain configuration information which is intended to change rarely, if at all. I.e., information in configuration registers 910 might be set upon initial installation of a system and might be altered upon major reconfiguration, such as the addition of processors to the system, or the system being re-partitioned. These registers can be altered only in hypervisor mode, i.e., are not intended to be written to from user executable code. Typically, information is loaded into configuration registers by a special-purpose service processor during system initialization. Among the information held in configuration registers 910 is a Logical Partitioning Environment Selector (LPES) bit 911 This bit is used to specify one of two operating system environments, designated "RS" and "AS". In the "RS" environment, non-hypervisor address references in E=R mode must be forced into the real memory subset of the processor's logical partition; in the "AS" environment, non-hypervisor address references in E=R mode are not allowed. Configuration registers 910 also contain a 12-bit real memory offset field 912, also referred to as a real memory offset register (RMOR), although it is physically part of the larger configuration register set 910. Configuration registers 910 also contain a 2-bit real memory limit field 913, also referred to as a real memory limit register (RMLR). Configuration registers 910 further contain a Logical Partition ID (LPID) field 914, which is an identifier assigned to the logical partition to which the processor belongs.

Figure 7:
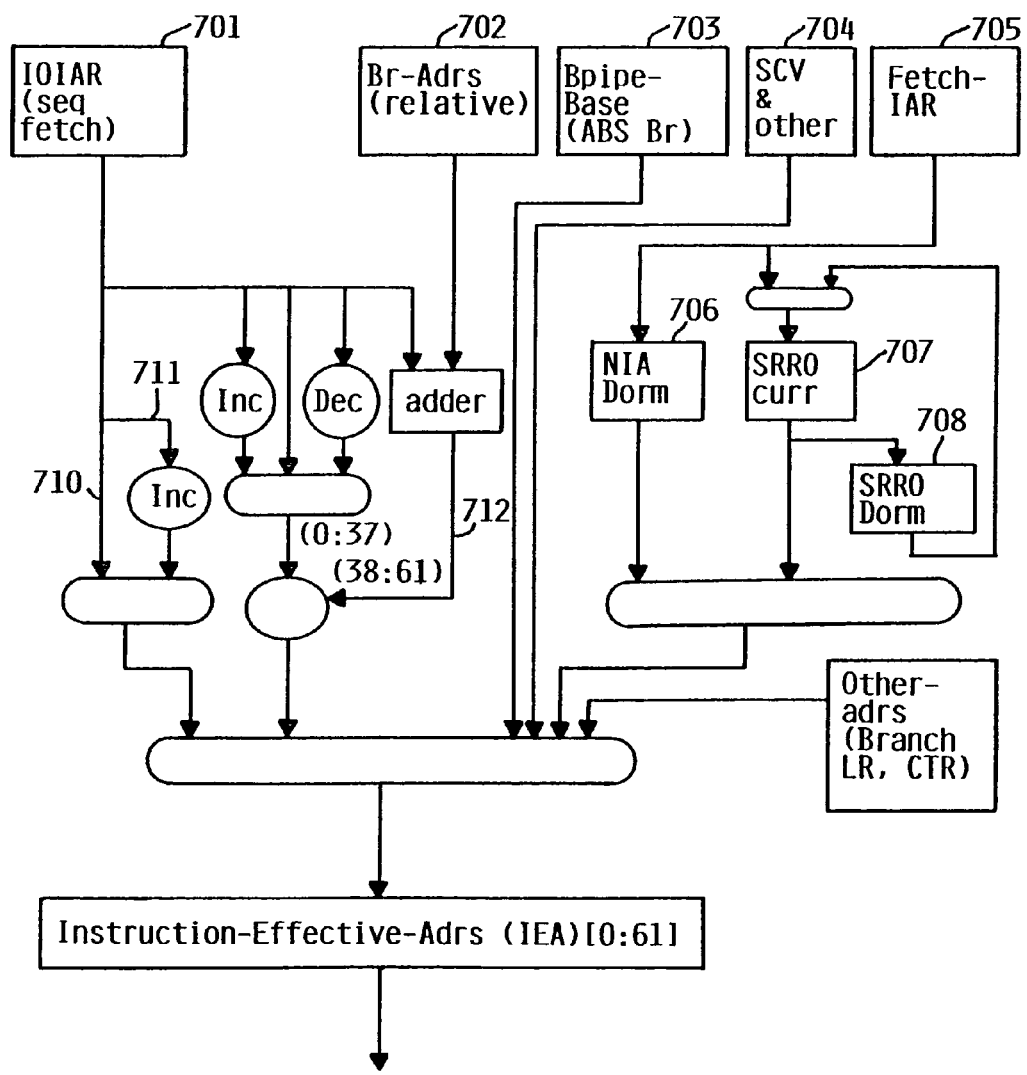
FIG. 7 illustrates at a high level the generation of effective addresses for instructions, according to the preferred embodiment.

The Pr bits 923, 933 and HV bits 925, 935 define the privilege state. If the HV bit is set, the corresponding thread is in the hypervisor state. If the HV bit is not set and the Pr bit is set, the corresponding thread is in the problem state. If nether bit is set, the corresponding thread is in the supervisor state. The HV bit can not be altered by a mtMSR instruction, for this would allow a thread in supervisor state to place itself in hypervisor state. The HV bit can only be set automatically by the hardware under certain predefined conditions, specifically certain interrupts (depending on the setting of LPES bit 911) or certain System Calls, any of which cause instructions to branch to one of a set of predefined locations. Naturally, these predefined locations must contain trusted code suitable for execution in hypervisor state. All predefined locations associated with Hypervisor state are contained within a single real address subset at the low address range. This subset is reserved and can not be assigned to any processor of multiprocessor system 100. The conditions for setting the HV bit can be summarized as follows:

$$MSR(HV) <== (\neg LPES \text{ AND } (Any\_Interrupt \text{ OR } System\_Call_{26})) \text{ OR } (LPES \text{ AND } (Machine\_Check\_Interrupt \text{ OR } System\_Reset\_Interrupt \text{ OR } System\_Call_{26}))$$

Where System_Call$_{26}$ indicates a System Call (not including a System Call Vectored) in which bit 26 is set. Upon return from the interrupt or system call, the previous thread state is reloaded in the MSR register from one of SRR1 registers 905 or 906. This previous state includes the previous value of HV bit 925, and the HV bit is thus reset to its previous value In a logically partitioned multiprocessor system, all address references in either problem or supervisor state should be confined to the logical partition associated with the processor which generated the address. Only in the hypervisor state should it be possible to reference an address outside this range. FIG. 7 illustrates at a conceptual level the generation of effective addresses of instructions in instruction unit 201. Instruction unit 201 is capable of generating an address in any of a variety of ways. 10 Instruction Address Register 701 represents generation from an address in the instruction address register, i.e., an immediate address in the current thread. The most common way to generate an address is by incrementing this address, represented as path 711. In some cases, the address in IOIAR 701 is used directly (e.g., when it was loaded into IOIAR 701), represented as path 710. Branch Address (relative) block 702 represents a relative branching instruction, in which an offset may be contained in the instruction or in a register. Because this is a branch relative instruction, the offset is added to low order address bits from IOIAR, and the high order bits from IOIAR may be incremented, decremented, or passed through unchanged. These bits are then combined, represented as path 712. Bpipe-Base block 703 represents generation of an absolute branch through various means, usually using a hardware branch pipeline, such as branching to a value from a general purpose or a special register, a value derived as a combination of bits in the instruction and register bits, indirect addressing, etc. SCV block 704 represents an address resulting from a system call or interrupt condition, which branch to predefined locations. Fetch Instruction Address Register block 705 represents address generation for speculative conditions. As shown, this might involve generation of the next instruction address for a dormant thread (block 706) or SRR0 registers which hold return from interrupted addresses for the current thread (block 707) and dormant thread (block 708), these values being swapped on a thread switch.

Ideally, instruction unit 201 provides a constant stream of instructions for decoding in decoder 206, and execution by execution unit 211. L1 I-cache 106 must respond to an access request with minimal delay. Where a requested instruction is actually in L1 I-cache, it must be possible to respond and fill the appropriate buffer without requiring decoder/dispatcher 206 to wait. Where L1 I-cache can not respond (i.e., the requested instruction is not in L1 I-cache), a longer path via cache fill bus 233 through memory management unit 222 must be taken. In this case, the instruction may be obtained from L2 cache 108, from main memory 102, or potentially from disk or other storage. It is also possible that the instruction will be obtained from L2 cache of another processor. In all of these cases, the delay required to fetch the instruction from a remote location may cause instruction unit 201 to switch threads. I.e., the active thread becomes inactive, the previously inactive thread becomes active, and the instruction unit 201 begins processing instructions of the previously inactive thread held in thread switch buffer 204.

Figure 3:
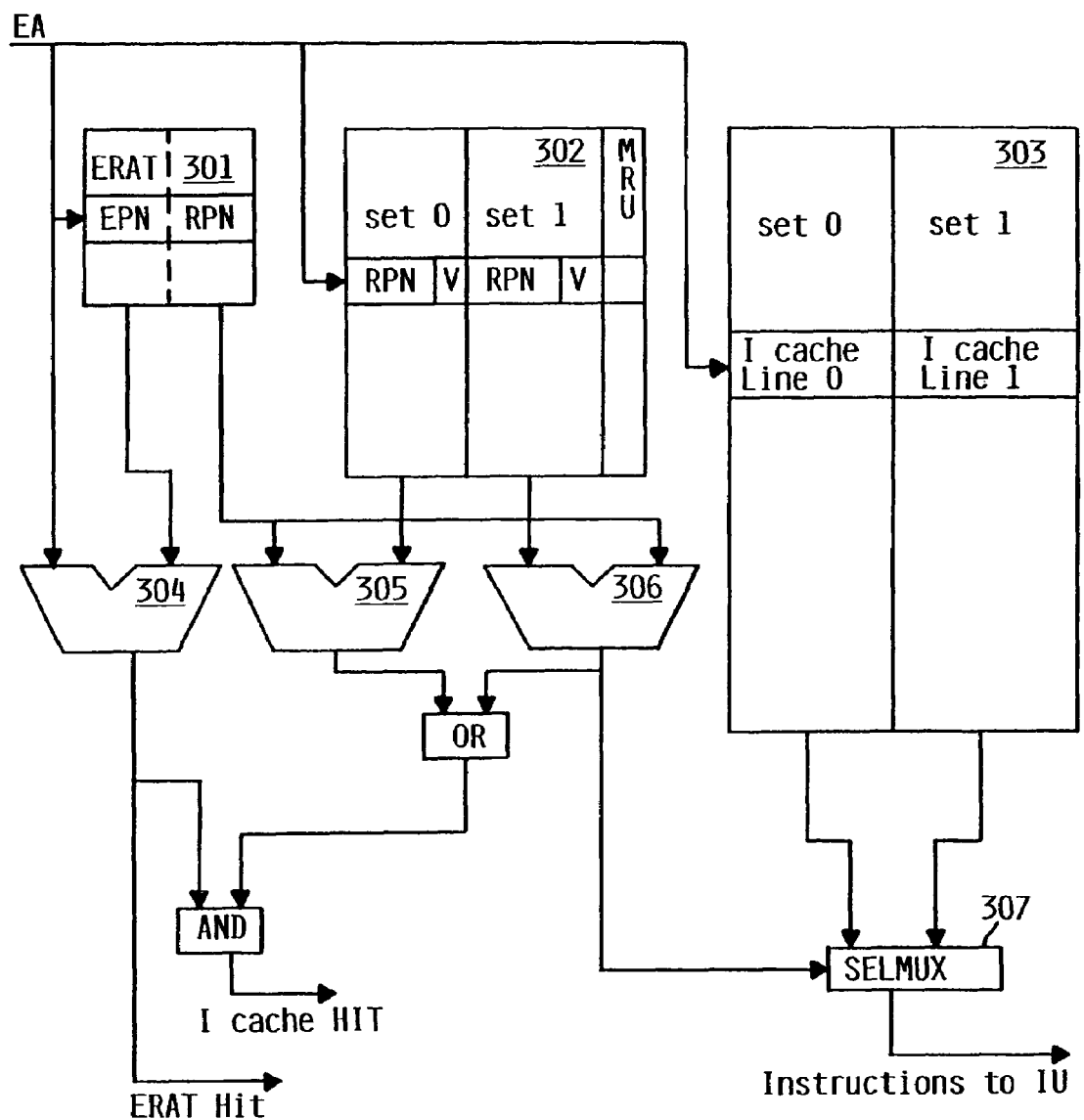
FIG. 3 illustrates the major components of an L1 instruction cache, according to the preferred embodiment.

FIG. 3 illustrates the major components of L1 I-cache 106 in greater detail than shown in FIGS. 1 or 2, according to the preferred embodiment. L1 I-cache 106 includes effective-to-real address table (ERAT) 301, I-cache directory array 302, and I-cache instruction array 303. I-cache instruction array 303 stores the actual instructions which are supplied to instruction unit 201 for execution. I-cache directory array 302 contains a collection of real page numbers, validity bits, and other information, used to manage instruction array 303, and in particular to determine whether a desired instruction is in fact in the instruction array 303. ERAT 301 contains pairs of effective page numbers and real page numbers, and is used for associating effective with real addresses.

When instruction unit 201 requests an instruction from I-cache 106, providing an effective address of the requested instruction, I-cache must rapidly determine whether the requested instruction is in fact in the cache, return the instruction if it is, and initiate action to obtain the instruction from elsewhere (e.g., L2 cache, main memory) if it is not. In the normal case where the instruction is in fact in L1 I-cache 106, the following actions occur concurrently within the I-cache, as illustrated in FIG. 3:

(a) The effective address from instruction unit 201 is used to access an entry in ERAT 301 to derive an effective page number and associated real page number.

(b) The effective address from instruction unit 201 is used to access an entry in directory array 302 to derive a pair of real page numbers.

(c) The effective address from instruction unit 201 is used to access an entry in instruction array 303 to derive a pair of cache lines containing instructions.

In each case above, the input to any one of ERAT 301, directory array 302, or instruction array 303, is not dependent on the output of any other one of these components, so that none of the above actions need await completion of any other before beginning. The output of the ERAT 301, directory array 302, and instruction array 303 are then processed as follows:

(a) The effective page number from ERAT 301 is compared with the same address bits of the effective address from instruction unit 201 in comparator 304; if they match, there has been an ERAT "hit". (But where addressing in E=R mode, the ERAT is always deemed "hit" regardless of the comparison, as explained below.)

(b) The real page number from ERAT 301 is compared with each of the real page numbers from directory array 302 in comparators 305 and 306; if either of these match, and if there has been an ERAT hit, then there is an I-cache "hit", i.e., the requested instruction is in fact in I-cache 106, and specifically, in instruction array 303.

(c) The output of the comparison of real page numbers from ERAT 301 and directory array 302 is used to select (using selection multiplexer 307) which of the pair of cache lines from instruction array 303 contains the desired instruction.

Performing these actions concurrently minimizes delay where the desired instruction is actually in the I-cache. Whether or not the desired instruction is in the I-cache, some data will be presented on the I-cache output to instruction unit 201. A separate I-cache hit signal will indicate to instruction unit 201 that the output data is in fact the desired instruction; where the I-cache hit signal absent, instruction unit 201 will ignore the output data. The actions taken by I-cache 106 in the event of a cache miss are discussed later herein.

Figure 4:
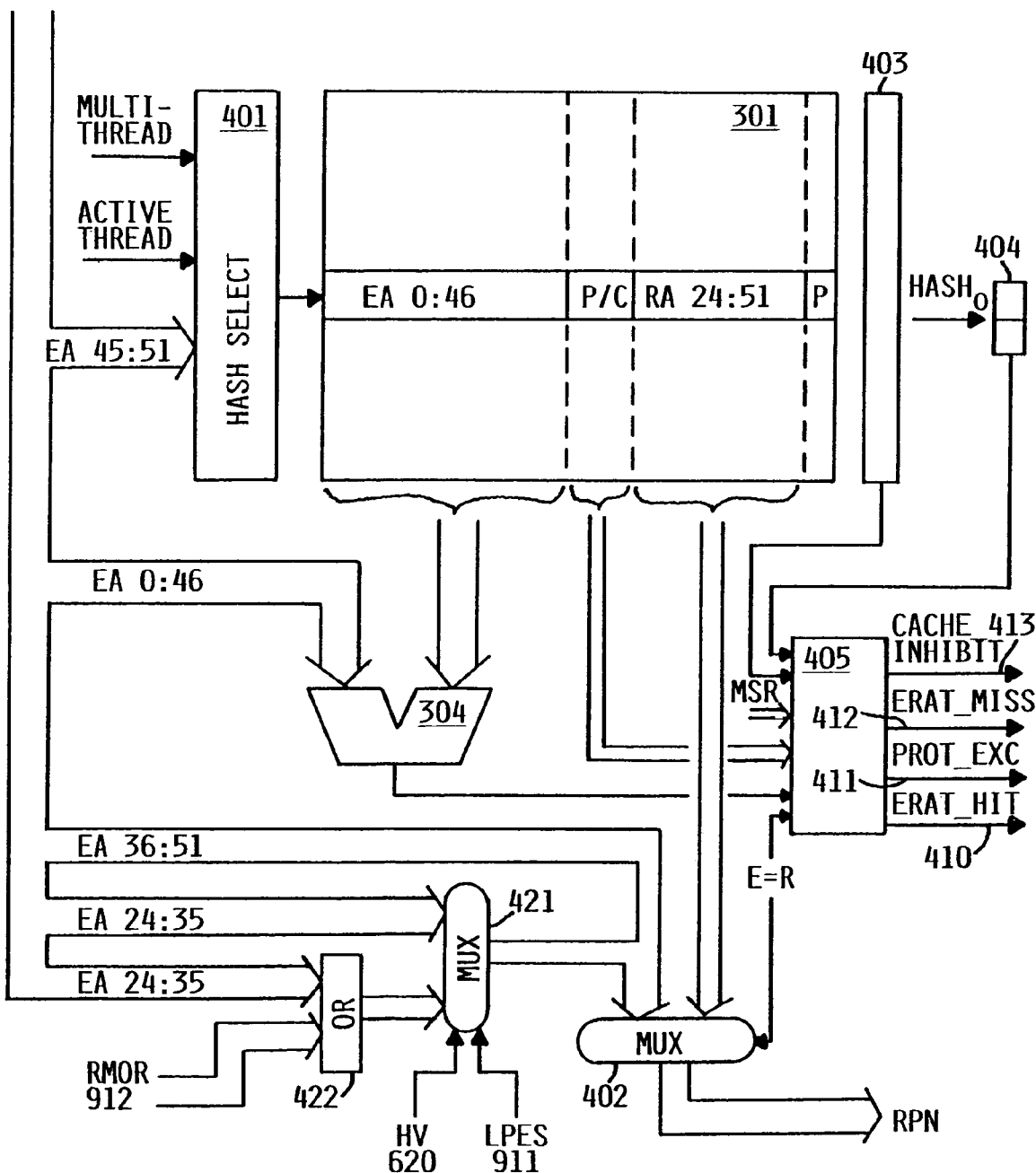
FIG. 4 illustrates in greater detail real address partitioning logic, an effective to real address table and associated control structures for instruction addresses, according to the preferred embodiment.

FIG. 4 shows in greater detail ERAT 301, and associated control structures. ERAT 301 is an 82-bit×128 array (i.e, contains 128 entries, each having 82 bits). Each ERAT entry contains a portion (bits 0–46) of an effective address, a portion (bits 24–51) of a real address, and several additional bits described below. ERAT 301 may be thought of as a small cache directly mapping a subset of effective addresses to their respective real addresses, thus avoiding the delays inherent in the address translation mechanism depicted in FIG. 8, described above. Because ERAT 301 is a cache of the larger mapping structures, mapped-to real addresses within the ERAT are confined to the logical partition of the processor which generated the effective address if partition integrity is maintained within the larger mapping structures, which is the responsibility of the operating system.

ERAT 301 is accessed by constructing a hash function of bits 45–51 of the effective address (EA), along with two control lines: multi-thread control line (MT), which indicates whether multithreading is active (in the CPU design of the preferred embodiment, it is possible to turn multithreading off); and ActThreadID line 961. The hash function (HASH) is as follows:

$$HASH_{0..6} = (EA_{45} \text{ AND } \neg MT) \text{ OR } (ActThreadID \text{ AND } MT) \| EA_{46} \| EA_{38} \text{ XOR } EA_{47} \| EA_{39} \text{ XOR } EA_{48} \| EA_{49:51}$$

As can be seen, this is a 7-bit function, which is sufficient to specify any one of the 128 entries in the ERAT. Select logic 401 selects the appropriate ERAT entry in accordance with the above hash function.

Comparator 304 compares bits 0–46 of the effective address generated by instruction unit 201 with the effective address portion of the selected ERAT entry. Because bits 47–51 of the effective address from instruction unit 201 were used to construct the hash function, it can be shown that a match of bits 0–46 is sufficient to guarantee a match of the full effective page number portion of the address, i.e. bits 0–51. A match of these two address portions means that the real page number ($RA_{24:51}$) in the ERAT entry is in fact the real page number corresponding to the effective address page number ($EA_{0:51}$) specified by instruction unit 201. For this reason, the effective address portion stored in an ERAT entry is sometimes loosely referred to as an effective page number, although in the preferred embodiment it contains only bits 0–46 of the effective page number.

Because the ERAT effectively by-passes the address translation mechanisms described above and depicted in FIG. 8, the ERAT duplicates some of the access control information contained in the normal address translation mechanism. I.e., a translation of effective address to real address will normally verify access rights through additional information contained in segment table 821, page table 822, or elsewhere. ERAT 301 caches a subset of this information to avoid the need to refer to these address translation mechanisms. Further information about the operation of the ERAT can be found in U.S. Pat. No. 6,021,481, entitled Effective-To-Real Address Cache Managing Apparatus and Method, herein incorporated by reference.

Each ERAT entry contains several parity, protection, and access control bits. In particular, each ERAT entry includes a cache inhibit bit, a problem state bit, and an access control bit. Additionally, separate array 403 (1 bit×128) contains a single valid bit associated with each respective ERAT entry. Finally, a pair of tag mode bits is stored in separate register 404. The valid bit from array 403 records whether the corresponding ERAT entry is valid; a variety of conditions might cause processor logic (not shown) to reset the valid bit, causing a subsequent access to the corresponding ERAT entry to reload the entry. The cache inhibit bit is used to inhibit writing the requested instruction to I-cache instruction array 303. I.e., although a range of addresses may contain an entry in ERAT, it may be desirable to avoid caching instructions in this address range in the I-cache. In this case, every request for an instruction in this address range will cause the line fill sequence logic (described below) to obtain the requested instruction, but the instruction will not be written to array 303 (nor will directory array 302 be updated). The problem state bit records the "problem state" of the active thread (from MSR(Pr) bit 923) at the time the ERAT entry is loaded. A thread executing in privileged state generally has greater access rights than one in problem state. If an ERAT entry were loaded during one state, and the problem state subsequently changed, there is a risk that the currently executing thread should not have access to addresses in the range of the ERAT entry, and this information must accordingly be verified when the ERAT is accessed. The access control bit also records access information at the time the ERAT entry was loaded, and is checked at the time of access. Tag mode bits 404 record the tag mode of the processor (tags active or tags inactive) when the ERAT was loaded; there is one tag mode bit associated with each half (64 entries) of the ERAT, which is selected using the 0 bit of the ERAT HASH function. Since tag mode affects how effective addresses are interpreted, a change to tag mode means that the real page numbers in the ERAT entry can not be considered reliable. It is expected that the tag mode will change infrequently, if ever. Therefore, if a change is detected, all entries in the corresponding half of the ERAT are marked invalid, and are eventually reloaded.

When CPU 101 is executing in effective=real mode, the ERAT is effectively bypassed. In a non-logically partitioned system, E=R would imply that the lower order 40 bits of effective address (i.e., $EA_{24:63}$) generated by instruction unit 201 are the same as the real address ($RA_{24:63}$), and hence any real address is potentially accessible. Logical partitioning requires that the effective addresses (base real address) be converted to a partitioned real address, i.e. one that is confined to some subset of the real address space. Bitwise OR logic 422 performs a logical OR of each bit in real memory offset register (RMOR) from configuration register set 910, with a corresponding bit of effective address in the range of bits 24 to 35, i.e., 12 bits in all are ORed. The bits in the RMOR correspond to the real address space of a logical partition. When using E=R mode and not in hypervisor state, the high order effective address bits in the range of those which enforce logical partitioning should all be zeroes. OR logic 422 is used instead of simple concatenation in order to support logically partitioned real address space subsets of different sizes. In the preferred embodiment, real address space subset sizes of 64 GB (236 bytes), 4 GB (232 bytes) and 256 MB (228 bytes) are supported. For example, when a partition size of 64 GB is being used, the 4 high order bits in RMOR will identify a real address space subset allocated to a logical partition, the 8 low order bits of RMOR must be set to 0, $EA_{24:27}$ must be 0, and $EA_{28:63}$ will specify a real address within the subset of the logical partition. Similarly, where a real address space subset size of 256 MB is being used, all 12 bits of the RMOR will identify a real address space subset, $EA_{24:35}$ must be 0, and $EA_{36:63}$ will specify a real address within the logical partition. In hypervisor state, a processor has access to the entire real memory address space and system resources, and the RMOR is therefore by-passed. Additionally, the RMOR is by-passed when LPES bit 911 is 0, indicating that computer system 100 is configured in "AS" environment. As shown in FIG. 4, HV bit 620 and LPES bit 911 control multiplexer 421, which selects effective address bits 24–35 ($EA_{24:35}$) if either of these conditions is present, and otherwise selects the output of OR logic 422.

As shown in FIG. 4, when control line E=R is active, selection multiplexer 402 selects $RA_{24:51}$ from the selected ERAT entry as the real page number (RPN) output when E=R is false, and multiplexer 402 selects the output of multiplexer 421, concatenated with $EA_{36:51}$ when E=R is true. Additionally, where E=R is true, the ERAT is deemed to be hit regardless of the comparison result in comparator 304.

ERAT logic 405 generates several control signals which control the use of the RPN output of selection multiplexer 402 and ERAT maintenance, based on the output of selector 304, the effective=real mode, the various bits described above, and certain bits in the CPU's Machine State Register (or MSRDorm, as the case may be). In particular, logic 405 generates ERAT Hit signal 410, Protection Exception signal 411, ERAT Miss signal 412, and Cache Inhibit signal 413.

ERAT Hit signal 410 signifies that the RPN output of selection multiplexer 402 may be used as the true real page number corresponding to the requested effective address. This signal is active when effective=real (by-passing the ERAT); or when comparator 304 detects a match and there is no protection exception and certain conditions which force an ERAT miss are not present. This can be expressed logically as follows:

ERAT_Hit=(E=R) OR (Match_304
    AND ¬Protection_Exc AND ¬Force_Miss)

Where Match_304 is the signal from comparator 304 indicating that $EA_{0:46}$ from instruction unit 201 matches $EA_{0:46}$ in the ERAT entry.

Protection Exception signal 411 signifies that, while the ERAT entry contains valid data, the currently executing process is not allowed to access it. ERAT Miss signal 412 indicates that the requested ERAT entry does not contain the desired real page number, or that the entry can not be considered reliable; in either case, the ERAT entry must be reloaded. Cache inhibit signal 413 prevents the requested instruction from being cached in instruction array 303. These signals are logically derived as follows:

Force_Miss=¬Valid OR (MSR(Pr)≠ERAT(Pr)) OR
    (MSR(TA)≠Tag_404)

Protection_Exc=¬(E=R) AND ¬Force_Miss AND
    Match_304 AND ERAT(AC) AND (MSR(Us)
    OR ¬MSR(TA))

ERAT_Miss=¬(E=R) AND (¬Match_304 OR
    Force_Miss)

Cache_Inhibit=¬(E=R) AND ERAT(CI)

Where:
  Valid is the value of valid bit from array 403;
  ERAT(Pr) is the problem state bit from the ERAT entry;
  ERAT(AC) is the access control bit from the ERAT entry;
  ERAT(CI) is the cache inhibit bit from the ERAT entry;
  MSR(TA) is the tags active bit from the Machine State Register;
  MSR(Us) is the User state bit from the Machine State Register; and
  Tag_404 is the selected tag bit from register 404.

I-cache directory array 302 and contains 512 entries, each having a pair of real page numbers, validity bits, parity bits, and a most-recently-used bit. An entry in array 302 is selected using effective address bits 48–56 ($EA_{48:56}$), which are used as a sparse hash function. Because there is no guarantee that either of the real page numbers contained in an entry in array 302 correspond to the full effective address page number of the desired instruction, both selected real page numbers are simultaneously compared with the real page number output 411 of ERAT 301, using comparators 305 and 306. The output of these and certain other logic determines which real page number, if any can be used. $EA_{48:58}$ simultaneously selects an entry from instruction array 303, and the results of comparators 305, 306 are used to select which set (i.e., which half of the entry) contains the associated instruction.

The above text describes the situation where the instruction sought is actually in the I-cache. Where there has been an I-cache miss, there are two possibilities: (a) there has been an ERAT hit, but the instruction is not in the instruction array; or (b) there has been an ERAT miss. In the case where there has been an ERAT hit, it is possible to fill the desired cache line significantly faster. Because the real page number is in the ERAT, the desired data is known to be in main memory (and possibly in an L2 cache). It is possible for logic in L1 I-cache 106 to construct the full real address of the desired instruction from ERAT data, without accessing external address translation mechanisms, and to fetch this data directly from L2 cache or memory. In the case where there has been an ERAT miss, an external address translation mechanism must be accessed in order to construct the real address of the desired instruction, and to update the ERAT as necessary with the new real page number. It is possible that in this case, the desired data will not exist in main memory at all, and will have to be read in from secondary storage such as a disk drive.

Further information concerning the operation of L-1 I-cache 106 is contained in U.S. Pat. No. 6,161,166, entitled Instruction Cache for Multithreaded Processor, herein incorporated by reference.

As described above, OR logic 422 performs a logical OR of address bits from the RMOR and the effective address to create an logically partitioned effective address which is offset from the effective address generated by instruction unit 201. The use of OR logic presumes that certain high order bits of the effective address are zeroes, otherwise the bits identifying the logical partition can be corrupted. These conditions and others are verified by address protection logic shown in FIG. 6.

Figure 6:
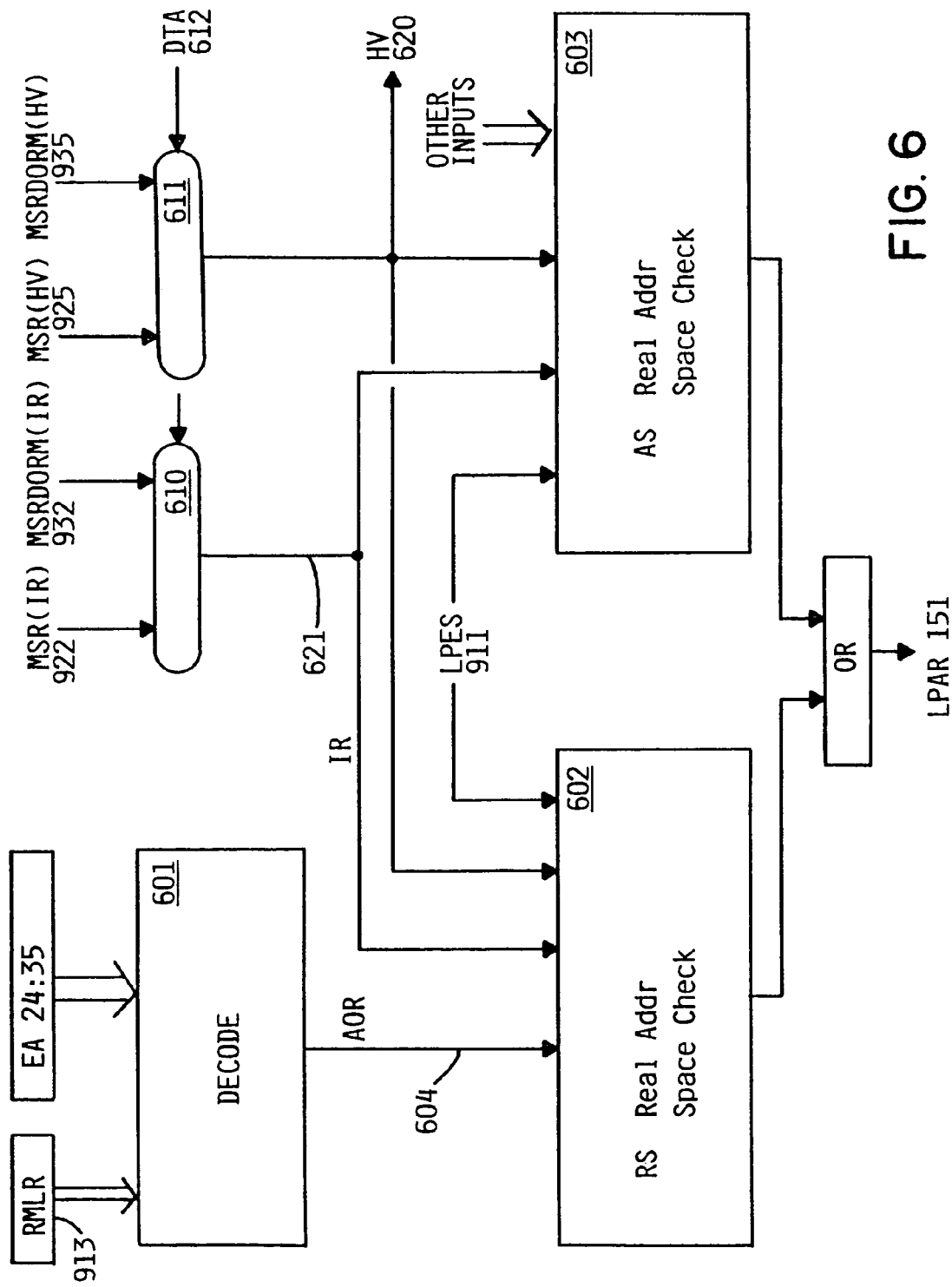
FIG. 6 illustrates the generation of instruction storage interrupts for enforcing logical partitioning, according to the preferred embodiment.

As shown in FIG. 6, the 2-bit real memory limit register (RMLR) 913 and effective address bits 24–35 ($EA_{24:35}$) are input to partition size decode logic 601. The RMLR designates the size of the logical partitions, as follows:

| RMLR value: | Partition size: |
|---|---|
| 0 0 | 64 GB |
| 1 0 | 4 GB |
| 1 1 | 256 MB |

Decode logic 601 outputs an address-out-of-range signal 604, a single bit value which is a logic '1' if the effective address runs outside the established partition size as specified in the RMLR. The logic function performed by decode logic 601 can be expressed as:

$AOR = EA_{24}$ OR $EA_{25}$ OR $EA_{26}$ OR $EA_{27}$ OR ($RMLR_0$
 AND $EA_{28}$) OR ($RMLR_0$ AND $EA_{29}$) OR ($RMLR_0$
 AND $EA_{30}$) OR ($RMLR_0$ AND $EA_{31}$) OR ($RMLR_1$
 AND $EA_{32}$) OR ($RMLR_1$ AND $EA_{33}$) OR ($RMLR_1$
 AND $EA_{34}$) OR ($RMLR_1$ AND $EA_{35}$)

Decode logic 601 generates an AOR signal as described above for all effective addresses generated by instruction unit 201. However, the signal is significant only if certain conditions are met. Specifically, if the effective address is translated through the address translation mechanism shown in FIG. 8, then the AOR signal is ignored because there is no correspondence of high order effective address bits and real address bits, and logical partitioning code under the control of the operating system assures that values in the translation tables enforce logical partitioning. The AOR signal is also ignored if the thread for which the address is generated is in hypervisor state, since such a thread is authorized to access all logical partitions. Finally, the AOR signal is ignored if the LPES bit is 0 (indicating an "AS" system environment).

The logic which performs these functions is shown in FIG. 6 as selectors 610, 611, and RS real address space check logic 602. Selector 610 selects either MSR(IR) signal 922 or MSRDorm(IR) signal 932, depending on incoming signal from DTA (Dormant Thread Address access select) line 612. DTA line 612 is active when the effective address is generated on behalf of the dormant thread, i.e., in the case of a background fetch of the dormant thread's instructions. In all other cases, the DTA line is low, indicating that the address is generated on behalf of the active thread. Selector 610 outputs on IR line 621 the MSRDorm(IR) signal if DTA line 612 is active, otherwise outputs the MSR(IR) signal. Selector 611 similarly selects either MSR(HV) signal 925 or MSRDorm(HV) signal 935, depending on DTA input 612. The output of selector 611, designated HV 620, is also used as input to multiplexer 421. The outputs of selectors 610 and 611 can be logically expressed as follows:

$IR = (\neg DTA$ AND $MSR(IR))$ OR $(DTA$ AND $MSRDorm(IR))$ $HV = (\neg DTA$ AND $MSR(HV))$ OR $(DTA$ AND $MSRDorm(HV))$ The output of RS real address space check logic 602 can be expressed as follows:

RS_check=LPES AND AOR AND ¬HV AND ¬IR

Where an "AS" mode operating system is used, AS real address space check logic 603 will generate an AS check signal if there is an attempt to generate an address in E=R mode, while not in hypervisor state. In other words, when in "AS" mode, E=R addressing can only be used in hypervisor state. The output of AS real address space check logic 603 can be expressed as follows:

AS_check=¬LPES AND ¬HV AND ¬IR

As shown in FIG. 6, an instruction storage interrupt is generated if there is an AS check or if there is and RS check, i.e.

LPAR ISI=AS_check OR RS_check

This is simply one set of possible conditions which may cause an interrupt. A protection exception signal 411 (explained above) also causes an instruction storage interrupt, as do various other conditions. The effect of the instruction storage interrupt is that the generated address is not accessed by the processor, and appropriate interrupt routines are called.

The above text and accompanying figures explain how addresses of instructions are verified and mapped to an address range corresponding to the logical partition of the processor which generated the address. Addresses of data are processed in a similar, although simplified, manner. Data addresses are processed using the logic depicted in FIGS. 5 and 6. Much of the logic which processes data addresses is physically separate from the logic which processes instruction addresses, although the two operate in a similar manner.

Unlike instructions (which may be pre-fetched for either the active or dormant thread), only the active thread generates data addresses. Therefore some of the logic shown in FIG. 6, which is required to process pre-fetched instruction addresses for a dormant thread, is not needed in the case of data addresses. Additionally, the L1 data cache does not use an ERAT.

Figure 5:
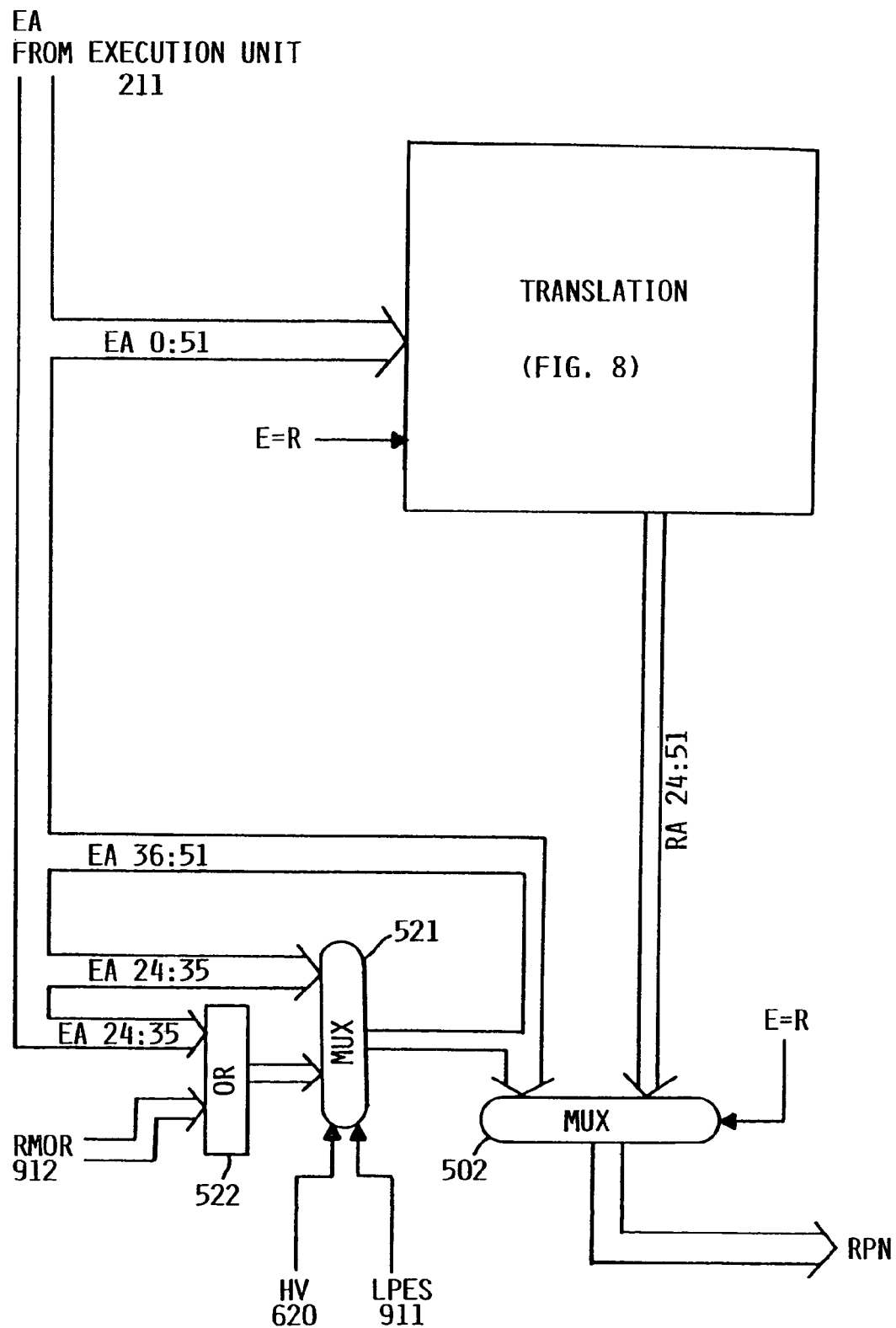
FIG. 5 illustrates real address partitioning logic for data addresses, according to the preferred embodiment.

FIG. 5 depicts the real address partitioning mechanism for data addresses, analogous to the partitioning mechanism for instruction addresses shown in FIG. 4. Execution unit 211 generates a data address by any of various conventional means known in the art, e.g., as a value taken from a register, as a field of an instruction concatenated or offset from a register value, as a computed value from multiple registers, etc. The effective address may or may not require translation. Where translation is indicated (E=R is false), address bits 0–51 are input to the translation mechanism (depicted at a high level in FIG. 8), which produces a translated 28-bit real page number. Where translation is not indicated (E=R is true), a partitioned real address is produced from the effective address in a manner similar to that explained above for instruction addresses. I.e., $EA_{24:35}$ is bitwise ORed with the contents of real memory offset register 912 by OR logic 522. Multiplexer 521 selects $EA_{24:35}$ if either HV 620 or LPES 911 is true, otherwise selects the output of logic 522. The output of multiplexer 521 is concatenated with $EA_{36:51}$ for input to multiplexer 502. Multiplexer 502 chooses either translated 28-bit real page number from the translation mechanism, or the output of multiplexer 521, as the 28-bit real page number, i.e., real address bits 24 to 51. The 12-bit byte index within the real page is taken directly from $EA_{52:63}$.

As in the case of instruction addresses, separate logic circuitry for data addresses produces an error signal. This logic is similar to that shown in FIG. 6, but simplified. In particular, because data addresses are only generated on behalf of the currently active thread, selectors 610 and 611 are not used in the logic which checks for LPAR address errors in data addresses. I.e., in the case of data addresses, HV=MSR(HV) and DR=MSR(DR). AS Real Address Space Check logic 603 is similarly simplified because only MSR (TA) and MSR(Pr) (and not MSRDorm(TA) and MSRDorm (Pr)) are used as input.

LPID 914 is used as a tag in certain bus operations to identify the relevant logical partition, thus limiting the effect of the bus operation and improving efficiency. A processor receiving data in such an operation from a bus to which it is attached will compare the tag received on the bus (the logical partition ID to which the operation pertains) with its own logical partition ID stored in its configuration register 910. If the two are not identical, the operation is ignored by the processor.

A simple example will demonstrate the potential performance improvement of this arrangement. ERAT 301 is essentially a cache of some of the information contained in segment table 821 and page table 822, the segment and page tables being external to the processor. Each logical partition has its own segment and page tables, which are maintained independently of those in other logical partitions. Since a logical partition may contain multiple processors, activity in another processor may cause a page fault or other condition which alters the contents of one or the other of these tables. In that event, the corresponding ERAT entries may be affected. Therefore, whenever the segment table or page table are modified, an appropriate message will be broadcast to all processors on the bus, so that each may invalidate any affected ERAT entry. If, however, a processor is in a different logical partition, its ERAT is not affected by such a change. By comparing the LPID in the bus tag with the processor's own LPID in its configuration register, the processor knows immediately (e.g., at the bus interface 225, without accessing ERAT 301) whether the bus message pertains to it, and can safely ignore any page table or segment table changes in for different logical partition.

The ability of code in hypervisor state to alter the information in configuration register 910 means that the logical partitioning of a system can be dynamically changed. E.g., processors and other resources can be re-allocated to different logical partitions, the address ranges associated with a logical partition can be altered, or partitioning can be turned off entirely. Since only code executing in hypervisor state can alter these registers, the system is protected from accidental re-configuration by user code.

Additional background information concerning an exemplary (although by no means the only possible) hypervisor implementation can be found in U.S. Pat. No. 6,691,146, herein incorporated by reference.

It will be understood that certain logic circuitry not essential to an understanding of the present invention has been omitted from the drawings and description herein for clarity. For example, logic for maintaining the MRU bit in array 302, logic for detecting parity errors and taking appropriate corrective action, etc., have been omitted.

In the preferred embodiment, a multithreaded processor employing coarse-grained hardware multithreading concepts is used. However, it will be understood that as alternative embodiments it would be possible to employ fine-grained multithreading operation, in which execution among the various threads is rotated on a cycle-by-cycle basis. It would also be possible to support logical partitioning as described herein on a processor which does not have hardware multithreading support.

While the invention has been described in connection with what is currently considered the most practical and preferred embodiments, it is to be understood that the invention is not limited to the disclosed embodiments, but on the contrary, is intended to cover various modifications and equivalent arrangements included within the spirit and scope of the appended claims.

What is claimed is:

1. A computer processing apparatus, comprising:
    a configuration register for recording configuration information, said configuration information including a processor logical partition identifier;
    at least one state register for recording processor operating parameters, said at least one state register including a mode designator, said mode designator designating an operating mode;
    execution logic for executing instructions, said instructions including at least one instruction for altering said processor logical partition identifier, wherein said execution logic executes said at least one instruction for altering said processor logical partition identifier when in a first operating mode, and does not execute said at least one instruction for altering said processor logical partition identifier when in a second operating mode; and
    bus interface logic, said bus interface logic receiving bus communications on a bus, at least some of said bus communications including a respective tag, said tag being a logical partition identifier to which the bus communication pertains;
    wherein said processing apparatus ignores a bus communication including a tag, said tag being a logical partition identifier to which the bus communication pertains, if the tag included in the bus communication does not match said processor logical partition identifier.

2. The computer processing apparatus of claim 1, further comprising:
    a plurality of sets of registers for supporting the execution of a plurality of threads, each set of registers corresponding to a respective one of said plurality of threads;
    wherein said at least one state register for recording processor operating parameters comprises a respective mode designator associated with each thread, said mode designator designating, for each of said threads independently, a respective operating mode; and wherein said execution logic executes said at least one instruction for altering said processor logical partition identifier when said at least one instruction for altering said processor logical partition identifier is part of a thread executing in said first operating mode, and does not execute said at least one instruction for altering said processor logical partition identifier when said at least one instruction for altering said processor logical partition identifier is part of a thread executing in said second operating mode.

3. The computer processing apparatus of claim 1, wherein said mode designator is placed in said first operating mode only upon occurrence of one of a set of predefined events.

4. The computer processing apparatus of claim 3, wherein each said predefined event of said set of predefined events causes said computer processing apparatus to branch to a respective predefined real memory address.

5. The computer processing apparatus of claim 3, wherein a state represented by said at least one state register is saved in a saved state register upon occurrence of one of said set of predefined events, and restored to said at least one state register upon return from processing said one of said set of predefined events.

6. The computer processing apparatus of claim 1, wherein at least some of said bus communications including a respective tag, said tag being a logical partition identifier to which the bus communication pertains, comprise cache entry invalidation messages.

7. A computer system, comprising:
a plurality of processors;
a main memory;
at least one bus supporting communication among said plurality of processors and said main memory;
a logical partitioning mechanism capable of partitioning said computer system into a plurality of logical partitions, each processor of said plurality of processors being assigned by said logical partitioning mechanism to a respective one of said logical partitions;
wherein each respective processor of said plurality of processors comprises:
a configuration register for recording configuration information, said configuration information including a processor logical partition identifier;
a mode designator, said mode designator designating an operating mode for said respective processor;
execution logic for executing instructions, said instructions including at least one instruction for altering said processor logical partition identifier, wherein said execution logic executes said at least one instruction for altering said processor logical partition identifier when in a first operating mode, and does not execute said at least one instruction for altering said processor logical partition identifier when in a second operating mode; and
bus interface logic, said bus interface logic receiving bus communications on said at least one bus, at least some of said bus communications including a respective tag, said tag being a logical partition identifier to which the bus communication pertains;
wherein said respective processor conditionally takes at least one action in response to a bus communication including a tag, said tag being a logical partition identifier to which the bus communication pertains, depending on a value of said tag included in the bus communication, said at least one action being taken only if said tag included in the bus communication matches said processor logical partition identifier.

8. The computer system of claim 7, wherein each said respective processor of said plurality of processors supports the execution of a plurality of threads and further comprises:
a plurality of mode designators, each mode designator corresponding to a respective one of said plurality of threads and designating, for each of said threads independently, a respective operating mode;
wherein said execution logic executes said at least one instruction for altering said processor logical partition identifier when said at least one instruction for altering said processor logical partition identifier is part of a thread executing in said first operating mode, and does not execute said at least one instruction for altering said processor logical partition identifier when said at least one instruction for altering said processor logical partition identifier is part of a thread executing in said second operating mode.

9. The computer system of claim 7, wherein said mode designator is placed in said first operating mode only upon occurrence of one of a set of predefined events.

10. The computer system of claim 9, wherein each said predefined event of said set of predefined events causes said processor to branch to a respective predefined real memory address.

11. The computer system of claim 9, wherein a state represented by said at least one state register is saved in a saved state register upon occurrence of one of said set of predefined events, and restored to said at least one state register upon return from processing said one of said set of predefined events.

12. The computer system of claim 7, wherein at least some of said bus communications including a respective tag, said tag being a logical partition identifier to which the bus communication pertains, comprise cache entry invalidation messages.

13. A computer processing apparatus, comprising:
a configuration register for recording configuration information, said configuration information including a processor logical partition identifier;
at least one state register for recording processor operating parameters, said at least one state register including a mode designator, said mode designator designating an operating mode;
execution logic for executing instructions, said instructions including at least one instruction for altering said processor logical partition identifier, wherein said execution logic executes said at least one instruction for altering said processor logical partition identifier when in a first operating mode, and does not execute said at least one instruction for altering said processor logical partition identifier when in a second operating mode; and
bus interface logic, said bus interface logic receiving bus communications on a bus, at least some of said bus communications including a respective tag, said tag being a logical partition identifier to which the bus communication pertains;
wherein said bus interface logic, upon receiving a bus communication including a tag, said tag being a logical partition identifier to which the bus communication pertains, compares the tag included in the bus communication with said processor logical partition identifier, and takes no further action responsive to receiving the bus communication if the tag included in the bus communication does not match said processor logical partition identifier.

14. The computer processing apparatus of claim 13, further comprising:
a plurality of sets of registers for supporting the execution of a plurality of threads, each set of registers corresponding to a respective one of said plurality of threads;
wherein said at least one state register for recording processor operating parameters comprises a respective mode designator associated with each thread, said mode designator designating, for each of said threads independently, a respective operating mode; and
wherein said execution logic executes said at least one instruction for altering said processor logical partition identifier when said at least one instruction for altering said processor logical partition identifier is part of a thread executing in said first operating mode, and does not execute said at least one instruction for altering said processor logical partition identifier when said at least one instruction for altering said processor logical partition identifier is part of a thread executing in said second operating mode.

15. The computer processing apparatus of claim 13, wherein said mode designator is placed in said first operating mode only upon occurrence of one of a set of predefined events.

16. The computer processing apparatus of claim 15, wherein each said predefined event of said set of predefined events causes said computer processing apparatus to branch to a respective predefined real memory address.

17. The computer processing apparatus of claim 15, wherein a state represented by said at least one state register is saved in a saved state register upon occurrence of one of said set of predefined events, and restored to said at least one state register upon return from processing said one of said set of predefined events.

18. The computer processing apparatus of claim 13, wherein at least some of said bus communications including a respective tag, said tag being a logical partition identifier to which the bus communication pertains, comprise cache entry invalidation messages.

* * * * *